United States Patent [19]

Nei et al.

[11] 4,297,873
[45] Nov. 3, 1981

[54] PLUGGING DEVICE

[75] Inventors: Hiromichi Nei; Ryoichi Ohtani, both of Yokohama; Iwao Ohshima, Kawasaki; Yuji Horikawa, Tokyo, all of Japan

[73] Assignee: Tokyo Shibaura Denki Kabushiki Kaisha, Kawasaki, Japan

[21] Appl. No.: 45,661

[22] Filed: Jun. 5, 1979

[30] Foreign Application Priority Data

Jun. 13, 1978 [JP] Japan ................................. 53-71094

[51] Int. Cl.³ ............................................ G01N 15/00
[52] U.S. Cl. ............................... 73/61 LM; 73/17 R
[58] Field of Search ............................ 73/61 LM, 17 R

[56] References Cited

U.S. PATENT DOCUMENTS

| 3,200,637 | 8/1965 | Ballou et al. | 73/61 LM |
| 3,340,725 | 9/1967 | Wilkinson | 73/61 LM |
| 3,343,401 | 9/1967 | DeLisle | 73/17 R |
| 3,462,997 | 8/1969 | Roach et al. | 73/61 LM |
| 3,996,790 | 12/1976 | Murase et al. | 73/61 LM |

*Primary Examiner*—Donald O. Woodiel
*Attorney, Agent, or Firm*—Oblon, Fisher, Spivak, McClelland & Maier

[57] ABSTRACT

Disclosed is a plugging device which comprises a plugging orifice having in a passage for a liquid metal a conical portion spreading out toward the upper-course side and a straight pipe portion extending from a small-diameter part of the conical portion at the lower-course end thereof to the lower-course side, whereby plenty of impurities in the liquid metal flowing supersaturated through the straight pipe portion are precipitated at the straight pipe portion, and a cooler so controlled as to stop a driving motor of a blower for cooling the liquid metal when the flow rate of the liquid metal is below a predetermined level and to rotate the motor in proportion to the deviation between the flow rate by actual measurement and the predetermined level of flow rate when the flow rate of the liquid metal is at the predetermined level or above.

11 Claims, 9 Drawing Figures

PLUGGING DEVICE

BACKGROUND OF THE INVENTION

This invention relates to a plugging device comprising a pump for introducing liquid metal from a main pipe, a cooler for cooling the liquid metal introduced by the pump, a plugging orifice having an orifice hole through which the cooled liquid metal is passed, whereby impurities dissolved in the liquid metal are precipitated mainly at the orifice hole to increase the flow resistance, a flow meter for measuring the flow rate of the liquid metal, a thermometer for measuring the temperature of the liquid metal flowing through the plugging orifice, and a control block for controlling the cooling capability of the cooler in response to flow rate signal delivered from the flow meter, so that the plugging temperature of the liquid metal is determined from the temperature measured by the thermometer.

The aforesaid type of plugging device, which has been widely used, involves many defects to be improved. Such defects will now be described with respect to a plugging device for measuring the plugging temperature of liquid sodium.

In various plants or sodium testing loops employing, for example, liquid sodium as a coolant, it is necessary to control impurities dissolved in the liquid sodium within a predetermined concentration range, in order to prevent corrosion of structural material and abrasion of sliding parts or to enable early-stage detection of water leak in a boiler using liquid sodium. These impurities may include $Na_2O$, $NaH$, etc. dissolved in liquid sodium. Generally, a well-known cold-trap device may be used for removing excessive impurities dissolved in liquid sodium, while a plugging device may usually be employed to detect the concentration of the impurities in the liquid sodium.

The conventional cold-trap device is a device to cool a liquid metal to a desired temperature and remove impurities precipitated at such temperature. In the plugging device, a fluid metal flowing through a passage with an orifice or an orifice passage is cooled to precipitate impurities dissolved in the liquid metal at the orifice or plugging orifice. Then the reduction of the flow rate of the liquid metal caused by such precipitation and the temperature of the liquid metal at the time of such reduction, i.e. plugging temperature, are measured, and the concentration of the dissolved impurities is determined according to the known relationship between the plugging temperature and the impurity concentration.

There are three systems to operate the plugging device; manual, automatic oscillatory, and automatic continuous operation systems. There will be described herein the generally used second and third systems.

In an automatic oscillatory operation of the device, the liquid metal is diverted from a process to be monitored by means of a suitable pump, and returned to the process through an orifice passage including a flow meter, cooler and plugging orifice. In the meantime, the flow rate and temperature of the liquid metal passing through the plugging orifice are measured by the flow meter and a theremometer disposed near the plugging orifice, respectively.

In measuring the plugging temperature by using the plugging device, the cooler is driven in response to a measured value of flow rate provided by the flow meter, and the temperature of the liquid metal passing through the plugging orifice is continuously reciprocatively varied between upper and lower limits by a suitable automatic control system. The plugging temperature to be determined may be found between the maximum and minimum values of the varying temperature. In this case, the plugging orifice is required to have its flow resistance changed susceptibly with temperature changes of the liquid metal for the high-accuracy, speedy measurement of the plugging temperature. Further needed is stability in the operation of the control system, as well as reduced time constant therefor. The time constant may effectively be reduced by diminishing the thermal capacity of the control system.

In order to fulfill the aforesaid requirements, various improvements have been made on the prior art plugging devices. One such improvement is the development of an annular-linear center-return electromagnetic pump with reduced size and simple pipe arrangement to be used in place of the conventional flat-linear, helical or AC conductive electromagnetic pump. Another improvement is the use of a high-sensitivity electromagnetic flow meter. Moreover, in order to improve the sensitivity of the plugging orifice and to prevent clogging thereof, there have been proposed and employed a valvelike plugging orifice with adjustable cross-sectional area of passage, plugging orifice formed of a plurality of restrictions, plugging orifice with an irregular hole.

With all these improvements, the prior art plugging devices cannot make high-accuracy measurement, requiring long measuring time and failing to secure stability in control. This is attributable to the fact that none of the plugging orifices developed so far has enough sensitivity and that the control system for the cooler is unsuitable.

Heretofore, an air flow from a blower delivering a fixed volume of air has been restricted to a desired volume, and then introduced into a cooling portion of the cooler. The air flow is restricted by rotating a damper attached to the blower correspondingly to the flow rate of the liquid metal. In such cooling system, the volume of air delivered from the blower through the damper is not zero even though the opening of the damper is zero. Accordingly, the cooling capability of the cooler cannot be reduced to zero. Further, the change of the volume of air or the cooling capability is larger as compared with the change of the damper opening while the damper opening is relatively small, whereas the change of the cooling capability becomes relatively smaller as the damper opening is increased.

The above-mentioned cooler control by means of the damper is not suited for the automatic oscillatory operation of the plugging device, exhibiting low accuracy for the plugging temperature measurement. This is the following necessity because the fact that prior art device is lacking. The necessity is, like the case of the manual control system, to maintain the cooling speed of the liquid metal substantially at a fixed level determined by the properties of the metal for high-accuracy measurement of plugging temperature by the automatic oscillatory operation. When using liquid sodium, for example, the cooling speed may be selected in a range from 3° to 10° C./min. preferably at 5° C./min. In order to obtain such cooling speed, high cooling capability and hence large volume of air are required where the concentration of impurities dissolved in the liquid metal and the plugging temperature are relatively low, whereas low cooling capability and hence small volume of air are needed where the impurity concentration and the plugging temperature are relatively high. According to the control system employing the damper, however, it is impossible to make high-accuracy measurement of the plugging temperature of liquid metal with high impurity concentration for the following reasons. That is, even though not required, the volume of air cannot be reduced entirely to zero. If a small volume air is required, it is necessary to use a low damper opening range in which the volume of air is changed largely with a small change of the damper opening, so that it is difficult to obtain a desired volume of air by finely controlling the damper opening. Also, where an extremely small volume of air is needed, the measurement will unavoidably be made with an unnecessarily large volume of air and hence an unnecessarily high cooling speed.

Moreover, where the aforementioned damper control system is applied to the automatic continuous operation, the flow rate of the liquid metal passing through the plugging orifice is lowered since the volume of air cannot entirely be reduced to zero. Therefore, if the damper opening is reduced to zero, the temperature of the liquid metal cannot be increased due to the remaining air flow, leaving the impurities to be continuously precipitated at the plugging orifice, thereby causing clogging of the orifice.

Other difficulties caused in the automatic continuous operation may be as follows. In general, the liquid metal is required to be cooled positively where the impurity concentration and the plugging temperature are both low, so that it is necessary to cool the liquid metal by a large volume of air with increased damper opening. With such low impurity concentration, however, the amount of impurities precipitated by a drop of liquid metal temperature is relatively small, and hence the change of the flow rate of the liquid metal is also relatively small. Accordingly, in the conventional automatic continuous operation where the flow rate value of the liquid metal is automatically controlled so as to coincide with a predetermined value by changing the liquid metal temperature in accordance with the deviation of the flow rate, it is advisable largely to change the flow of air supplied through the damper as compared with the flow rate deviation, for the stability of the automatic control. If the impurity concentration is high, on the other hand, the amount of impurities precipitated by the temperature drop is relatively large, and therefore the change of the flow rate is also relatively large. Accordingly, in the automatic continuous operation, it is to be desired for the fineness of the automatic control that the change of the volume of air from the damper be relatively small as compared with the flow rate deviation. Meanwhile, in the conventional damper control system to change the damper angle in proportion to the flow rate deviation, the change of the volume of air caused by the flow rate change of liquid metal is the contrary of desired one, so that the flow rate of the liquid metal may vary from the predetermined value, failing to secure accurate measurement of the plugging temperature.

Thus, the prior art system to cool the liquid metal by means of the air flow delivered through the damper is not suitable for either of the automatic oscillatory and continuous operations of the plugging device.

SUMMARY OF THE INVENTION

The object of this invention to provide a plugging device free from the defects to which the prior art plugging devices are subject, and capable of steady and speedy high-accuracy measurement of the plugging temperature of impurities dissolved in liquid metal.

In order to attain the above object, the plugging device of this invention includes a plugging orifice with an orifice hole which consists of a conical taper portion spreading out toward the upper-course side of liquid metal flowing through the orifice hole and a straight pipe portion with a restricted aperture on the lower-course side adjacent thereto.

By the use of the aforesaid plugging orifice, impurities dissolved in the liquid metal cooled and supersaturated with such impurities are rapidly precipitated at the small-diameter straight pipe portion of the plugging orifice when the liquid metal passes through the plugging orifice, so that the cross-sectional area of the passage at the straight pipe portion may effectively be reduced. Accordingly, the flow rate of the liquid metal passing through the orifice is lowered. Thus, responding sensitively to the temperature change of the liquid metal, the plugging orifice of this invention can change the flow rate of the liquid metal.

By using the above-mentioned highly sensitive plugging orifice, the flow of the liquid metal used with the plugging device may be reduced, thereby minimizing the size of components including an electromagnetic pump, electromagnetic flow meter, cooler, economizer, etc. Accordingly, there may be achieved reduction in size and cost of the device, as well as of the thermal capacity of the whole device, so that the time constant for the control of the device is diminished to enable high-cuuracy measurement of the plugging temperature in a short time.

According to a preferred embodiment of the device of this invention, a motor to rotate a blower included in the cooler is driven at a speed proportional to a control voltage supplied from a control block included in the device. Since the motor thus controlled can perfectly be stopped, the quantity of air from the blower may be reduced to zero, and the relationship between the flow rate of the liquid metal and the blower speed, and hence the cooling capability of the cooler, can be set suitably for the plugging temperature measurement by properly selecting the relative levels of the output voltage from the control block and the flow rate of the liquid metal. Namely, ulike the case of the conventional blower air control by means of a damper, the blower may be so controlled as susceptibly to increase the volume of air from the blower with the change of the blower speed where high blower speed or high cooling capability is required. When rotating the blower at a low speed with low cooling capability, on the other hand, the blower may be so controlled as slowly to change the volume of air with the blower speed change. By such blower or cooler control, the measurement of the plugging temperature by means of the plugging device can be made with stability, thereby securing high accuracy for the plugging temperature measurement.

DETAILED DESCRIPTION OF THE PREFERRED EMBODIMENT

Figure 1:
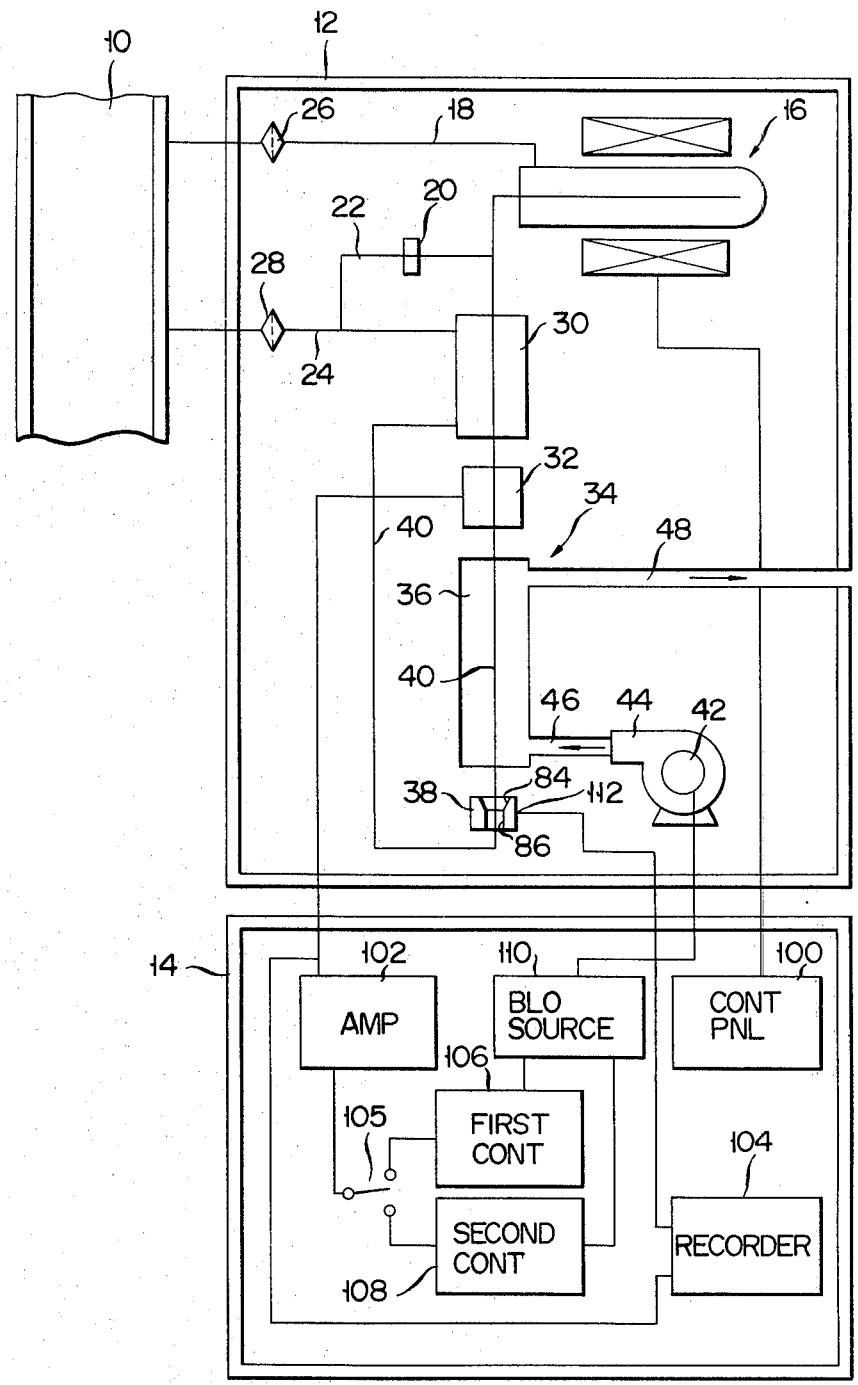
FIG. 1 is a block diagram showing the whole system of the plugging device of this invention.

FIG. 1 shows a plugging device for liquid sodium flowing through a main pipe 10. Numeral 12 denotes a mechanical block which contains mechanisms to carry the liquid sodium, a measuring instrument, and a cooler for the liquid sodium, while numeral 14 designates a control block including electronic and electric circuits for controlling the mechanical block. For the simplicity of the drawing, distributing wires in the control block 14 shown in FIG. 1 are limited to those which are useful for illustrating the controlling system. The liquid sodium flowing through the main pipe 10 passes through an inlet pipe 18 and then an electromagnetic pump 16, where it is bisected. One branch of the flow returns to the main pipe 10 through a by-pass line 22 with a restriction 20 and an outlet pipe 24. Numerals 26 and 28 designate filters. The other branch goes back to the main pipe 10 via a passage inside an economizer 30, an electromagnetic flow meter 32, a cooling portion 36 of a cooler, a plugging orifice 38, an orifice passage 40 including a outside passage of the economizer 30, and the outlet pipe 24. The cooler 34 comprises a blower 44 driven by a DC motor 42, the cooling portion 36 surrounding the orifice passage 40, a pipe 46 for feeding the cooling portion 36 with a cooling air current delivered from the blower 44, and a pipe 48 for discharging air that has passed through the cooling portion 36.

Figure 2:
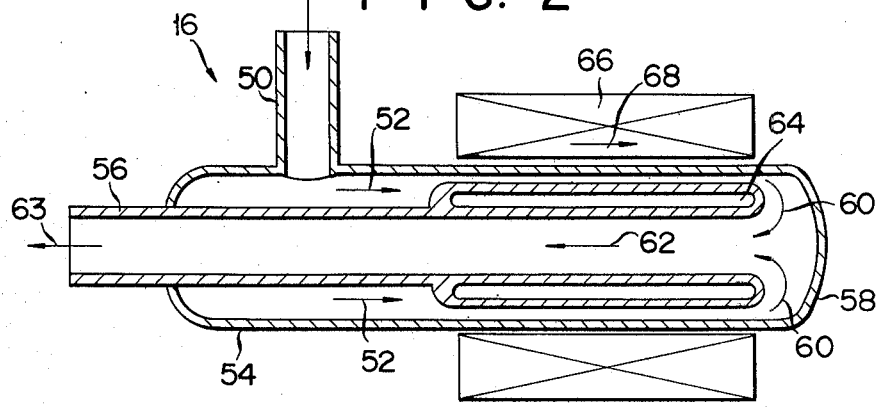
FIG. 2 is a profile of an electromagnetic pump used with the device of FIG. 1.

The electromagnetic pump, as shown in detail in FIG. 2, is of the well-known center-return type ALIP (annular-linear-induction-pump), in which liquid sodium introduced through an inlet pipe 50 flows in the direction of arrows 52 between an outer pipe 54 and an inner pipe 56, reverses its course to the direction of arrows 60 at an end 58 of the outer pipe 54, and is carried in the direction of arrows 62 and 63 through the inner pipe 56. Numeral 64 designates an internal magnetic core embedded in the inner pipe 56 at the right end portion thereof, while numeral 66 denotes an annular stator with a coil capable of generating a magnetic field shifting in the direction of an arrow 68. In this type of electromagnetic pump, the pipes for the passage carrying the liquid sodium are short and simple due to the passage's coaxial dual structure, so that the amount of liquid sodium existing in the pump may be relatively small, whereby the space required for the pipe arrangement, as well as for the pump itself, can be reduced.

Figure 3:
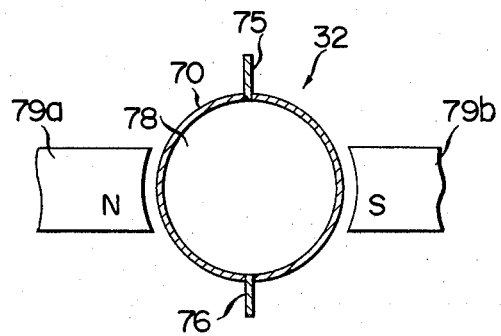
FIG. 3 is a cross-sectional view of an electromagnetic flow meter used with the device of FIG. 1.

FIG. 3 is a cross-sectional view illustrating the electromagnetic flow meter 32. The flow meter 32 comprises a pipe 70, electrodes 75 and 76 on top and bottom of the outer pipe 70 as illustrated, and magnetic poles N and S. The electrodes 75 and 76 electrically touch through the pipe 70 the liquid sodium flowing at right angles to the drawing. The magnetic poles N and S, which are disposed on both sides of the pipe 70 respectively, generates a magnetic field traversing the liquid sodium inside the space 78. When the liquid sodium is passed through the space 78, a DC voltage, whose polarity may be determined by the respective directions of the magnetic field and the flow of the liquid sodium, is produced between the electrodes 75 and 76. The level of such voltage is in proportion to the flow rate of the liquid sodium. Therefore, the quantity of the liquid sodium flowing per unit time through the plugging orifice 38 may be determined by measuring the voltage across the electrodes 75 and 76.

Driven by the DC motor 42 with a rotating speed in proportion to a control voltage supplied from a blower power source 110 in the control block 14, the blower 44 of FIG. 1 supplies the cooling portion 36 of the cooler 34 with a volume of air delivered from the blower per unit time corresponding to the rotating speed thereof (hereinafter discribed simply as volume of air). The motor 42 is a separately excited DC motor in which a field coil is excited at a fixed voltage and an armature is supplied with the control voltage from the blower power source 110.

Figure 4:
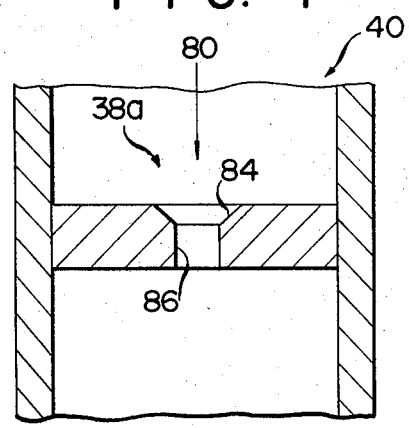
FIGS. 4 and 5 each show an example of a plugging orifice as shown in FIG. 1.
Figure 5:
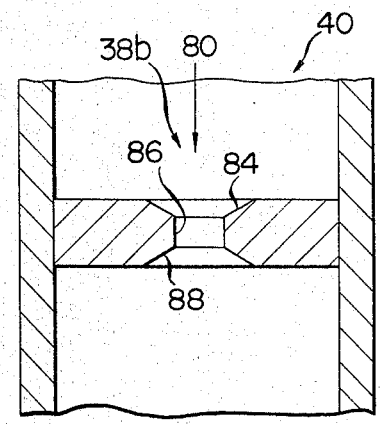

FIGS. 4 and 5 show two types 38a and 38b of the plugging orifice 38, respectively. The liquid sodium delivered from the cooler 34 flows in the direction of an arrow 80 through the orifice passage 40, running downward through the plugging orifice 38a and 38b in the course of the passage 40. The plugging orifice 38a as shown in FIG. 4 is formed of a conical taper portion 84 on the upper-course side and a straight pipe portion 86 extending in the axial direction of the passage 40 to adjoin the taper portion. On the other hand, the plugging orifice 38b as shown in FIG. 5 has conical portions 84 and 88 on the upper- and lower-course sides of the straight pipe portion 86, respectively. In the case of FIG. 4, the liquid sodium is cooled at the cooling portion 36 of the cooler 34 to be suppersaturated with dissolved impurities, and flows through the taper portion 84 into the small-diameter straight pipe portion 86. The flow of the liquid sodium increases its speed at the straight pipe portion 86 to cause turbulence. Accordingly, plenty of dissolved impurities are precipitated at the straight pipe portion 86, thereby effectively reducing the size of the passage of the small-diameter straight pipe portion 86. Namely, the flow rate of the liquid sodium flowing through the orifice passage 40 responds sensitively to the temperature drop of the liquid sodium to be decreased. When the liquid temperature is increased, on the other hand, the precipitated impurities sticking to the straight pipe portion 86 are again dissolved to increase the flow rate susceptibly. The taper portion 84 tends to allow the flow of the liquid sodium to be smoothly introduced into the straight pipe portion 86 through the taper portion 84 so as effectively to cause turbulence. As for the taper portion 88 formed on the lower-course side in the plugging orifice 38b of FIG. 5, it is so designed as to let flow smoothly the liquid sodium that has passed through the straight pipe portion 85 down to the orifice passage 40 with a larger diameter.

Now there will be described electric circuits included in the control block 14 of FIG. 1. Numeral 100 denotes a control panel for driving the electromagnetic pump 16 at a predetermined rotating speed. The electromagnetic flow meter 32 delivers an output signal to indicate the flow rate of the liquid sodium. The output signal is linearly amplified by an amplifier 102 and registered in a recorder 104. The output of the amplifier 102 is supplied to a first controller 106 for automatic oscillatory operation of the plugging device or a second controller 108 for automatic continuous operation of the plugging device, via a changeover switch 105. The first and second controllers, as mentioned later, deliver output signals to the blower power source 110 in accordance with predetermined systems, and the blower power source 110 supplies the DC motor 42 with a DC voltage corresponding to the system selected by the changeover switch 105.

The temperature of the liquid sodium flowing through the plugging orifice 38 is measured by a thermometer 112 embedded in the plugging orifice 38, and registered in a recorder 104. The thermometer 112 used may employ a thermocouple, thermistor or some other conventional sensor, while the recorder 104 may be of any known type, such as a self-balancing recorder.

Figure 6:
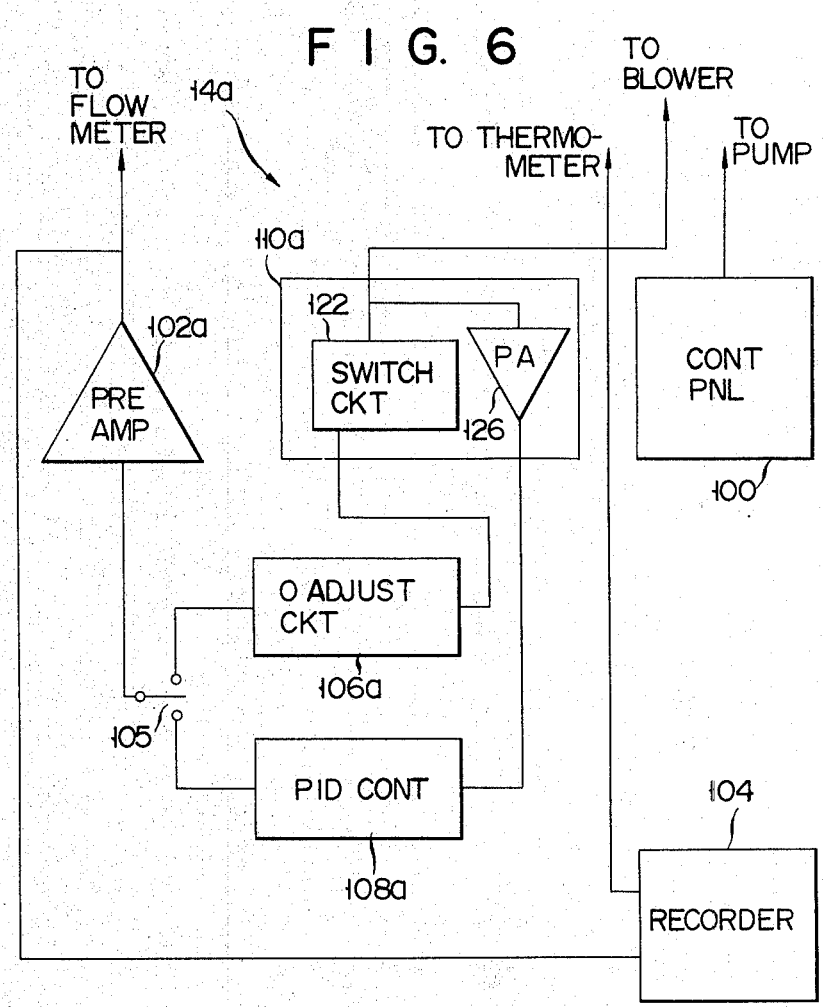
FIG. 6 shows an example of a control block as shown in FIG. 1.

The electric circuits constituting the control block 14 may assume varied configurations according to the controlling system. FIG. 6 shows an example 14a selected among such configurations. In the control block 14a, a preamplifier 102a is used for the amplifier 102, and a zero adjuster circuit 106a to shift the zero point of the output voltage is used for the first controller 106. For the second controller 108, moreover, there is used a PID controller 108a for automatically controlling the temperature of the liquid sodium so as to mate the flow rate of the liquid sodium with a predetermined value. Available for the blower power source 110 is a power circuit 110a as illustrated, which includes a voltage switching circuit 122 and a power amplifier 126. The voltage switching circuit 122 does not supply the armature of the DC motor 42 with power where the output of the zero adjuster circuit 106a is zero, though it will operate to apply a predetermined voltage to the armature of the DC motor 42 when the output is delivered from the circuit 106a. The power amplifier circuit 126 amplifies an output signal from the PID controller 108a and supplies it to the armature of the DC motor.

In the automatic oscillatory operation of the plugging device, the output of the preamplifier 102a is supplied to the zero adjuster circuit 106a by operating the changeover switch 105. Where the cooler is not started yet and the flow rate of the liquid sodium is at its initial or maximum value in the beginning, the predetermined DC voltage is supplied from the voltage switching circuit 122 to the armature of the motor 42 in response to an output signal from the zero adjuster circuit 106a. Accordingly, the motor 42 is driven to cool the liquid sodium. When the flow rate of the liquid sodium is reduced below a set level by such cooling, the output of the zero adjuster circuit 106a and hence the output of the voltage switching circuit 122 become zero, so that the DC motor 42 will never be driven, thereby increasing the temperature of the liquid sodium. When the flow rate of the liquid sodium reaches the initial value or the flow rate before the start of the precipitation by cooling, as a result of the temperature rise, the aforementioned actions are repeated, and thereafter the flow rate and temperature of the liquid sodium continue oscillatory fluctuations. In this operation, the cooling of the liquid sodium is started when the impurities precipitated at the plugging orifice 38 are all dissolved in the liquid sodium and the flow rate of the liquid sodium is restored to the high level before starting of the precipitation. Moreover, the control circuit is so adjusted that the point of time when the cooling of the liquid sodium is interrupted to increase the temperature coincides with the time when the flow rate of the liquid sodium is reduced to the predetermined level. Although the flow rate and temperature are changed actually earlier than the above two points of time in accordance with the time constant for the controlling system, a high-accuracy measurement of the plugging temperature may be made by properly selecting the flow rate where the cooling is stopped and using a susceptible controlly system with a small time constant. In such measurement, a substantially correct value of plugging temperature can be obtained by determining the average value of the upper and lower limits of the temperature change of the liquid sodium. This automatic oscillatory plugging temperature measurement differs from the automatic continuous measurement as mentioned later and is characterized in that all the impurities precipitated at the plugging orifice 38 are repeatedly periodically dissolved and again precipitated.

The plugging device operated in the automatic oscillatory system may achieve practically fully accurate measurement of the plugging temperature in a short time with a relatively simple construction, requiring no such PID controller as is essential to the automatic continuous operation system. This is so because the device of this invention employs the high-sensitivity plugging orifice 38 as described with reference to FIGS. 4 and 5, so that the flow rate of the liquid sodium to be passed through the device may be decreased, thereby reducing the electromagnetic pump 16, economizer 30 and cooler 34 in size, as well as the thermal capacity of each part and the time constant of the automatic control system. Further, according to the plugging device of the invention, the flow of the air for the cooler 34 may be changed by directly controlling the rotational speed of the DC motor for driving the blower 44 without employing a damper as may be used in the prior art device, so that the volume of air may be reduced entirely to zero by stopping the motor 42, accordingly, in cooling the liquid sodium, an optimum liquid sodium cooling speed of 5° C./min can be obtained by properly selecting the value of the voltage supplied to the armature of the motor 42. Thus, also in this respect, an accurate measurement of the plugging temperature may be made.

In the automatic continuous measurement of the plugging temperature, on the other hand, the changeover switch 105 is operated to supply the output of the preamplifier 102a to the PID controller 108a. A reference flow rate of the liquid sodium is previously set in the PID controller 108a. The PID controller 108a produces an output signal proportional to the deviation between the measured value of the flow rate and the reference flow rate value of the liquid sodium, and the output signal is linearly amplified by the power amplifier 126, and then supplied to the armature of the DC motor 42. In consequence, if the flow rate of the liquid sodium is higher than the reference level, the DC motor and hence the blower 44 rotate at a speed proportional to the aforesaid deviation. Accordingly, the liquid sodium passing through the cooler 34 is cooled, and the impurities are deposited at the plugging orifice 38, thereby the flow rate of the liquid sodium is reduced. When the flow rate is reduced below the reference level, the drive of the DC motor 42 by the voltage amplifier 126 is stopped, and the temperature of the liquid sodium starts to increase. These operations are repeated at short intervals, and the flow rate and temperature of the liquid sodium flowing through the plugging orifice 38, and hence the amount of the precipitated impurities sticking to the plugging orifice, continue narrow fluctuations. On the average, however, each of these values may be automatically controlled at a substantially fixed level. In this case, the measured value of the plugging temperature is identical with such substantially fixed temperature. A positive difference of this automatic continuous operation from the automatic oscillatory operation lies in that an amount of impurities enough to mate the flow rate of the liquid sodium substantially with the reference level are continually precipitated at and sticking to the plugging orifice 38. Since the automatic control circuit including the above-mentioned controller is generally known, further detailed description thereof is omitted herein.

By the automatic continuous operation of the plugging device, there may be used the high-sensitivity plugging orifice 38 as shown in FIGS. 4 and 5, whereby an accurate measurement can be made in a short time as already described in connection with the automatic oscillatory operation. Besides, in order to control the cooling capability of the blower 44, the rotational speed of the DC motor 42 is continuously varied by the PID controller 108a, so that an accurate and stable measurement of the plugging temperature can be achieved for the following reason. That is, the relation between the speed of the DC motor 42 and the volume of the air from the blower 44 is such that the volume is zero when the motor speed is zero, and that the former increases acceleratedly as the latter increases, from the nature of the blower 44. As stated above, the DC motor 42 is supplied with the voltage proportional to the deviation from the reference flow rate, and the blower 44 is driven at the speed in proportion such deviation. Accordingly, if the deviation is large and high cooling capability is required, the blower 44 will be operated within a high speed range where the cooling capability varies faster as compared with the change of the deviation. On the other hand, if the deviation is small and only low cooling capability is enough, the blower 44 will be operated within a low speed range where the cooling capability varies more slowly than the deviation does. This provides a favorable condition for the operation of the plugging device. Thus, the temperature control of the liquid sodium flowing through the plugging orifice 38 based on the flow rate thereof may be achieved with high stability, and the fluctuations in the flow rate and temperature curves given by the recorder 104 are insignificant, ensuring accurate measurement of the plugging temperature.

Figure 7:
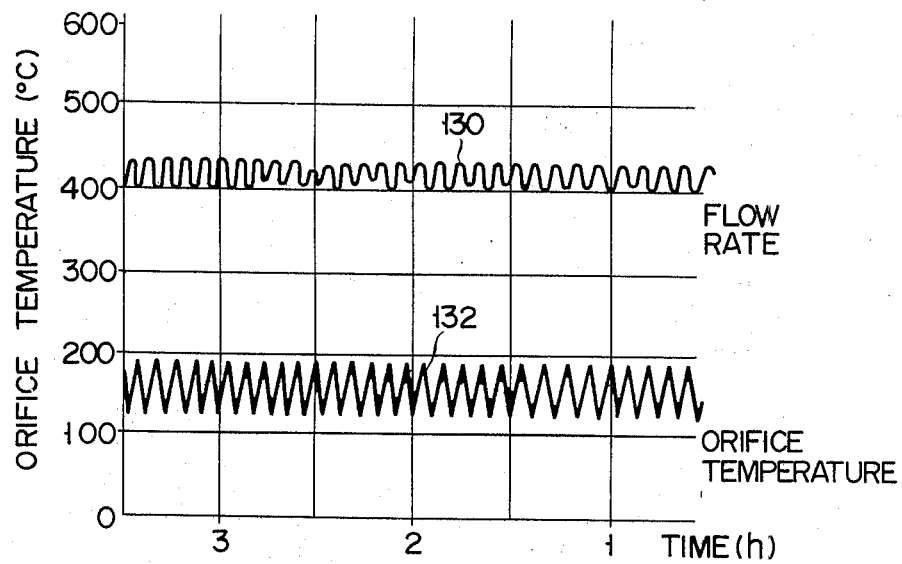
FIG. 7 is a graph showing the changes of the flow rate and temperature of liquid sodium with the passage of time in an automatic oscillatory operation of the device of FIG. 1.
Figure 8:
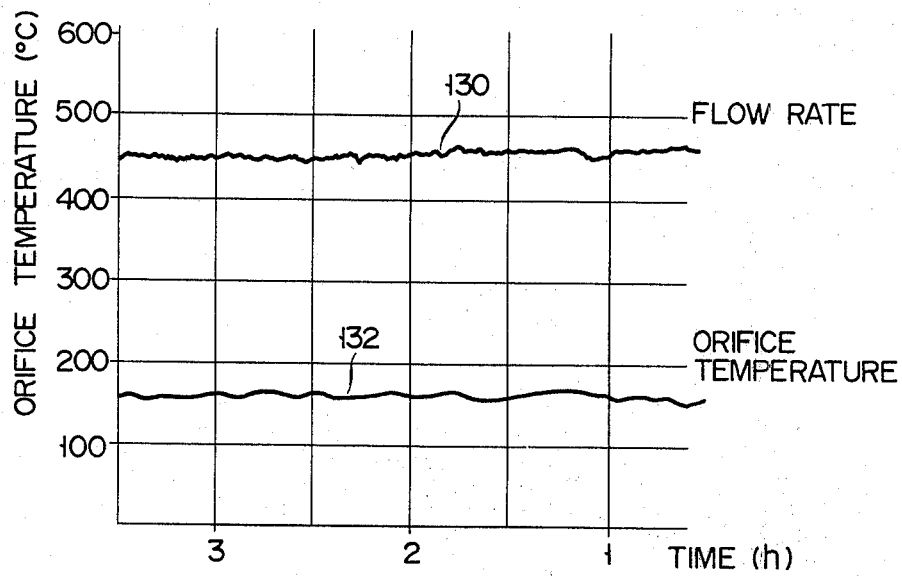
FIG. 8 is a graph showing the changes of the flow rate and temperature of the liquid sodium with the passage of time in an automatic continuous operation of the device of FIG. 1.

Curves 130 and 132 of FIGS. 7 and 8 are flow rate curves and temperature curves respectively, showing change with the passage of time of the flow rate and temperature of the liquid sodium passing through the plugging orifice 38 in the automatic oscillatory and continuous measurements of the plugging temperature by means of the control system 14 of FIG. 6. Both curves 130 and 132 of FIG. 7 fluctuate vibrantly, and the plugging temperature is obtained as an average value taken from the temperature curve 132. In FIG. 8, the two curves 130 and 132 fluctuate narrowly, and the plugging temperature is obtained as an average value taken from the temperature curve 132.

Figure 9:
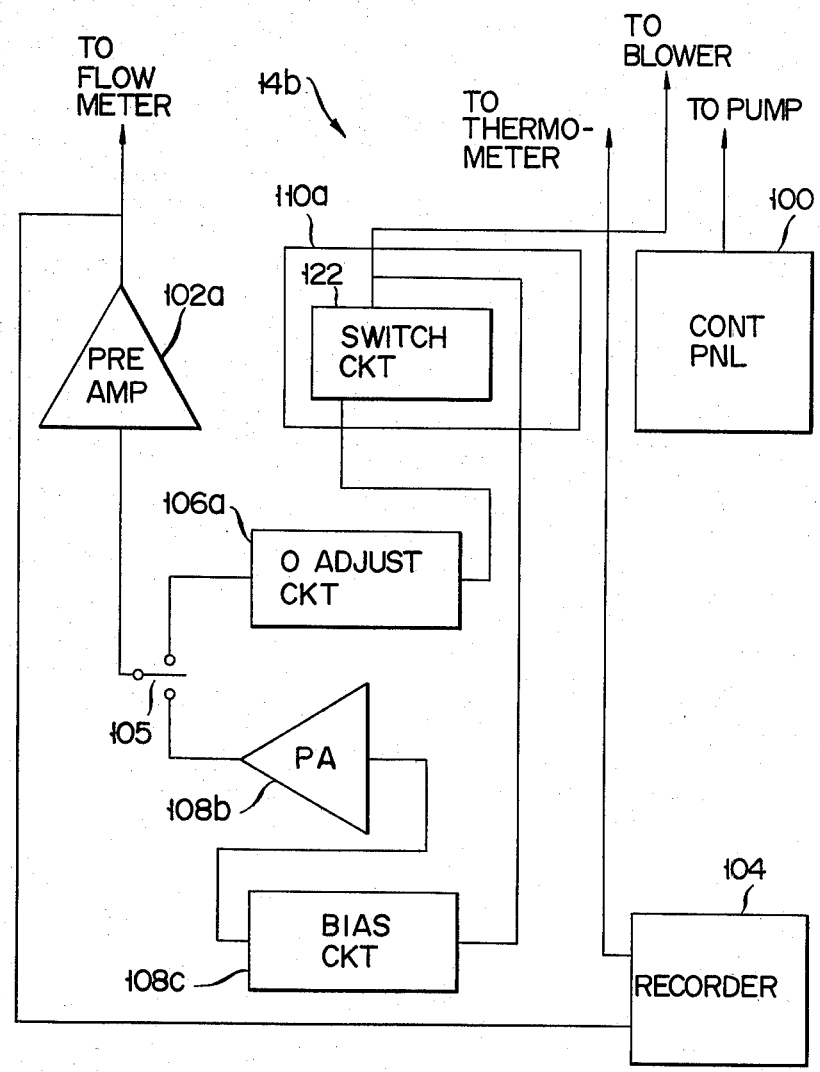
FIG. 9 shows another example of the control block of FIG. 1.

FIG. 9 shows a control block 14b different from the control block 14a of FIG. 6. The former differs from the latter in that there is used, instead of the PID controller 108a, an electric circuit which produces a driving voltage increasing in proportion to the difference between the measured flow rate and the predetermined flow rate of the liquid sodium when the former exceeds the latter, and such that the output signal, as well as the speed of the DC motor 42, has a maximum when the measured flow rate attains its maximum. This electric circuit is composed of a power amplifier 108b capable of adjusting the amplification degree and a bias voltage generator circuit 108c to supply a bias voltage to the DC motor 42 lest the power amplifier 108b should supply the DC motor 42 with the driving voltage where the flow rate is below the predetermined level. The bias voltage is adjustable.

A second difference between the control blocks 14a and 14b is that the power amplifier 126 provided for the power circuit 110a of FIG. 6 is removed from a power circuit 110b as shown in FIG. 9. Since the automatic oscillatory operation, out of the operations of the plugging device by the use of the control block 14b, is the same as the case of the embodiment of FIG. 6, there will now be described only the automatic continuous operation.

First, let it be supposed that the cooler 34 is not driven and the flow rate of the liquid sodium passing through the orifice 38 is at its maximum or the predetermined value, and that an automatic continuous operation is started under such conditions. In this case, the flow rate measured by the electromagnetic flow meter 32 practically resumes the initial value or maximum value, a maximum driving voltage is applied to the DC motor 42, and the liquid sodium is positively cooled by the cooler 34 rapidly to reduce its temperature. The flow rate of the liquid sodium passing through the plugging orifice 38 is substantially at the initial value which is obtained before the temperature of the liquid sodium reaches the plugging temperature, whereas, when flow rate reaches the plugging temperature, impurities are precipitated at the plugging orifice 38 to reduce the flow rate, lowering the driving voltage applied to the DC motor 42. By the function of the bias voltage generator circuit 108c, as stated before, the driving voltage supplied to the DC motor 42 may be reduced drastically (e.g., to zero) when the flow rate of the liquid sodium is reduced to a predetermined level, for example 50% of the initial flow rate, so that the temperature and flow rate of the liquid sodium passing through the plugging orifice 38 are settled at their respective fixed values when the flow rate is reduced to a certain degree. This is done because the control system is so constructed that the temperature may be raised or lowered to increase or decrease the flow rate if the flow rate is too low or too high, respectively. The DC motor 42 and hence the blower 44 operate so as to maintain the temperature, thereby precipitating at the plugging orifice 38 the impurities required for the maintenance of the flow rate. A temperature then determined by the thermometer 112 is the very plugging temperature to be obtained.

While the measurement of the plugging temperature may be made in the aforementioned manner, the flow rate of the liquid sodium is a substantially fixed value automatically determined mainly by the amount of the dissolved impurities and adjustment of the bias generator circuit 108c.

Thus, the plugging temperature measurement by means of the control block 14b of FIG. 9 needs only the relatively simple power amplifier 108b and the bias generator circuit 108c, in place of the PID control 108a for maintaining the flow rate at a level that is required by the control block 14a of FIG. 6. Moreover, the speed of the DC motor 42 is controlled in proportion to the flow rate deviation of the liquid sodium by means of the high-sensitivity plugging orifice 38 as aforesaid, an accurate value of the plugging temperature may steadily be obtained in a short time.

What we claim is:

1. A plugging device comprising a pump for introducing liquid metal from a main pipe, a cooler for cooling the liquid metal introduced by said pump, a plugging orifice having an orifice hole through which said cooled liquid metal is passed, said orifice hole having a taper portion spreading out toward the upper-course side and a straight pipe portion with a restricted aperture on the lower-course side adjacent thereto, whereby impurities dissolved in said liquid metal are precipitated mainly at said straight pipe portion to increase the flow resistance, a flow meter for measuring the flow rate of said liquid metal, a thermometer for measuring the temperature of the liquid metal flowing through said plugging orifice, and a control block for controlling the cooling capability of said cooler in response to a flow rate signal delivered from said flow meter, said cooler including a motor to rotate at a speed proportional to a DC voltage supplied from said control block and a blower driven by said motor, so that the plugging temperature of said liquid metal is determined from the temperature measured by said thermometer.

2. A plugging device according to claim 1, wherein said motor is a separately excited DC motor excited at a predetermined voltage level and having an armature to which the DC voltage from said control block is applied.

3. A plugging device according to claim 2, wherein said control block includes an amplifier for amplifying an output signal delivered from said flow meter, a first controller for automatic oscillatory operation of said plugging device, a second controller for automatic continuous operation of said device, and a blower power source for supplying a DC voltage to said separately excited DC motor in accordance with the output signal of said amplifier and the selection between said two operation systems.

4. A plugging device according to claim 3, wherein said amplifier is a linear preamplifier.

5. A plugging device according to claim 4, wherein said first controller includes a zero adjuster circuit delivering an output signal only when an output signal from said flow meter is larger than a predetermined value.

6. A plugging device according to claim 5, wherein said blower power source is a power circuit including voltage switching circuit for supplying a predetermined voltage to said motor only when supplied with an output signal from said zero adjuster circuit.

7. A plugging device according to claim 6, wherein said second controller includes a linear power amplifier for amplifying the output of said preamplifier at a predetermined desired amplification degree, and a bias voltage generator circuit connected in series with said amplifier and so formed as to start supplying a driving voltage to said motor when the flow rate of said liquid metal exceeds a predetermined level and to apply a maximum voltage to said motor when a maximum flow rate is attained.

8. A plugging device according to claim 7, wherein said control block further includes a recorder for recording the outputs of said flow meter and thermometer and a control panel for driving said pump.

9. A plugging device according to claim 6, wherein said second controller is a PID controller supplied with a predetermined reference value of flow rate of the liquid metal to deliver an output signal in accordance with the deviation between the reference value and measured flow rate value.

10. A plugging device according to claim 9, wherein said electric circuit includes a power amplifier for linearly amplifying the output of said PID controller and supplying the amplified output to said DC motor.

11. A plugging device according to claim 10, wherein said control block further includes a recorder for recording the outputs of said flow meter and thermometer and a control panel for driving said pump.

* * * * *